(12) United States Patent
Ottestad

(10) Patent No.: US 6,805,145 B2
(45) Date of Patent: Oct. 19, 2004

(54) METHOD AND DEVICE FOR MAINTAINING A FLUID PRESSURE IN A DEFINED VOLUME

(75) Inventor: Nils T. Ottestad, Tonsberg (NO)

(73) Assignee: Framo Engineering AS, Bergen (NO)

(*) Notice: Subject to any disclaimer, the term of this patent is extended or adjusted under 35 U.S.C. 154(b) by 0 days.

(21) Appl. No.: 10/297,363

(22) PCT Filed: Jun. 5, 2001

(86) PCT No.: PCT/NO01/00229

§ 371 (c)(1),
(2), (4) Date: Apr. 28, 2003

(87) PCT Pub. No.: WO01/94904

PCT Pub. Date: Dec. 13, 2001

(65) Prior Publication Data

US 2004/0003847 A1 Jan. 8, 2004

(30) Foreign Application Priority Data

Jun. 5, 2000 (NO) .......................................... 20002865

(51) Int. Cl.⁷ .............................................. F17D 1/16
(52) U.S. Cl. .................... 137/14; 137/505; 137/505.42; 137/551; 137/624.14
(58) Field of Search ..................... 137/14, 505, 505.15, 137/505.42, 484.8, 551, 624.14

(56) References Cited

U.S. PATENT DOCUMENTS 2,586,131 A * 2/1952 Wells ..................... 137/624.14
3,621,887 A * 11/1971 Johnson ..................... 137/484.8
5,234,026 A    8/1993 Patterson

FOREIGN PATENT DOCUMENTS

| EP | 0 964 235 A1 | 12/1999 |
| GB | 2 099 112 A | 12/1982 |
| WO | WO 99/28722 | 6/1999 |
| WO | WO 01/50052 A1 | 7/2001 |

* cited by examiner

Primary Examiner—Stephen M. Hepperle
(74) Attorney, Agent, or Firm—Wood, Phillips, Katz, Clark & Mortimer

(57) ABSTRACT

A method and a regulating valve for maintaining a fluid pressure within a defined volume (3), and simultaneous registering of discharge of fluid from the volume as a result of leakage or consumption. The fluid is supplied from a pressure regulating valve (20) provided with a means (5–7, 22–26) which opens for the supply of fluid to the volume (3) when the pressure therein has sunk below a first value (P1), and which shuts off the fluid supply when the pressure in the volume (3) has achieved a preset second value (P2) which is substantially higher than the first value (P1). Thus, after each opening of the regulating valve (20) there occurs a distinct pressure increase at the valve outlet. This pressure increase is registered as a pressure pulse, and the frequency of delivered pressure pulses is monitored and utilised as a measure of occurring leakage and/or consumption of the supplied fluid.

7 Claims, 4 Drawing Sheets

METHOD AND DEVICE FOR MAINTAINING A FLUID PRESSURE IN A DEFINED VOLUME

The invention relates to a method for maintaining a fluid pressure within a defined volume, and simultaneously registering discharge of fluid from the volume as a result of leakage or consumption.

The invention further relates to a regulating valve for maintaining a fluid pressure within a defined volume, and for simultaneous registering of discharge of fluid from the volume a result of leakage or consumption, which valve comprises a valve housing having a first chamber constituting said volume and communicating with a valve outlet, and a piston arranged in the chamber and being influenced in a first direction by a biasing spring and a reference pressure, and cooperating through an operating rod with a valve body for opening and closing of a passage between a valve inlet and the upstream end of the chamber, the valve body being spring-loaded towards the closed position in the opposite direction to that of the piston, so that the valve is closed when the piston is in equilibrium in the chamber at a first pressure in the chamber, but opens when the pressure in the chamber sinks below the first pressure.

Such a method is of interest in connection with the operation of rotating machines for use in subsea installations for oil and gas production, to keep control of pressure conditions and a possible leakage in mechanical seals in such machines. Typical machines will be multiphase pumps, wet gas compressors, water injection pumps, rotating separators, etc. Such mechanical seals for example are used for sealing between a process liquid and a barrier liquid in case of rotating shafts, and the sealing function often is contingent upon having a hydraulic overpressure from a pure barrier liquid lying for example 10–20 bar above a surrounding pressure which normally will be the process liquid pressure. The mechanical seals normally have a certain leakage of barrier liquid into the process liquid. It is therefore necessary to provide for a continuous supply of barrier liquid. After some time of operation the consumption of barrier liquid in subsea installations may increase because of wear of the mechanical seals, and it may be necessary to carry out an overhaul of the rotating machine. In this connection it is important to have a continuous control of the barrier liquid consumption, so that replacement can be planned and carried out in time.

In the rotating machines which are installed at the seabed today, and which utilise a barrier liquid for lubrication and cooling, the pressure regulation usually takes place from a platform or a production ship. The pressure is controlled by a hydraulic power unit (HPU) on board the platform or the production ship. The pressure is set on a fixed pressure or is changed based on pressure signals from the machine and the process at the seabed. Such a system has a slow response and will only be used in case of relatively short distances between the HPU unit and the subsea installation. Such a system will also have limitations at greater ocean depths because of static head and thereby a minimum pressure below which the system can not regulate.

There are also known other subsea regulating systems in which a pressure regulating function is effected at the seabed. These known solutions are relatively complicated and space demanding, the solutions consisting of a system having a major number of valves, compensator bellows against process pressure, etc.

The object of the invention is to provide a method and a device implying a very simple pressure monitoring and pressure regulation in connection with mechanical seals of the relevant type, and which solve the problems discussed above in that the regulation takes place locally at the rotating machine.

The above-mentioned object is achieved with a method of the introductorily stated type which, according to the invention, is characterised in that the fluid is supplied from a pressure regulating valve provided with a means opening for the supply of fluid to the volume when the pressure therein has sunk bellow a first value, and shutting-off the fluid supply when the pressure in the volume has reached a preset second value which is substantially higher than the first value, a pressure pulse delivered from the regulating valve thereby being registered, and that the frequency of delivered pressure pulses is monitored and utilised as a measure of occurring leakage and/or consumption of the fluid.

The stated object is also achieved with a regulating valve which is of the introductorily stated type, and which is characterised in that the valve is provided with a means causing that movement of the valve body to the closed position of the passage only takes place at a second pressure in the first chamber which is substantially higher than the first pressure, so that a distinct pressure increase occurs at the valve outlet after each opening of the valve. This pressure increase can be registered as a distinct pressure pulse even if the higher second pressure is not achieved immediately.

In the present invention said monitoring is carried out simply by registering the pressure pulses generated each time the regulating valve opens for the supply of fluid, i.e. barrier liquid, to the relevant volume. The pressure pulses suitably are registered with a standard pressure sensor mounted in the barrier oil circuit on the rotating machine. In case of installation of several rotating machines on the same subsea structure, these may use a common umbilical for the supply of barrier oil from the platform or production ship in question. This is connected to the valve inlet and has a constant supply pressure which is higher than the level of the outlet pressure of the valve at the valve outlet. Based on the frequency of the pressure pulses it will be possible to monitor the sealing condition and compensate for the current barrier liquid consumption. The valve device according to the invention only consists of a valve housing and constitutes a much simpler and more compact solution than what is used in the prior art.

The invention will be further described bellow in connection with exemplary embodiments with reference to the drawings, wherein FIG. 1 shows a longitudinal section of a pressure regulating valve of a known design;

In the different figures, corresponding parts and elements are designated by the same reference numerals.

Figure 1:
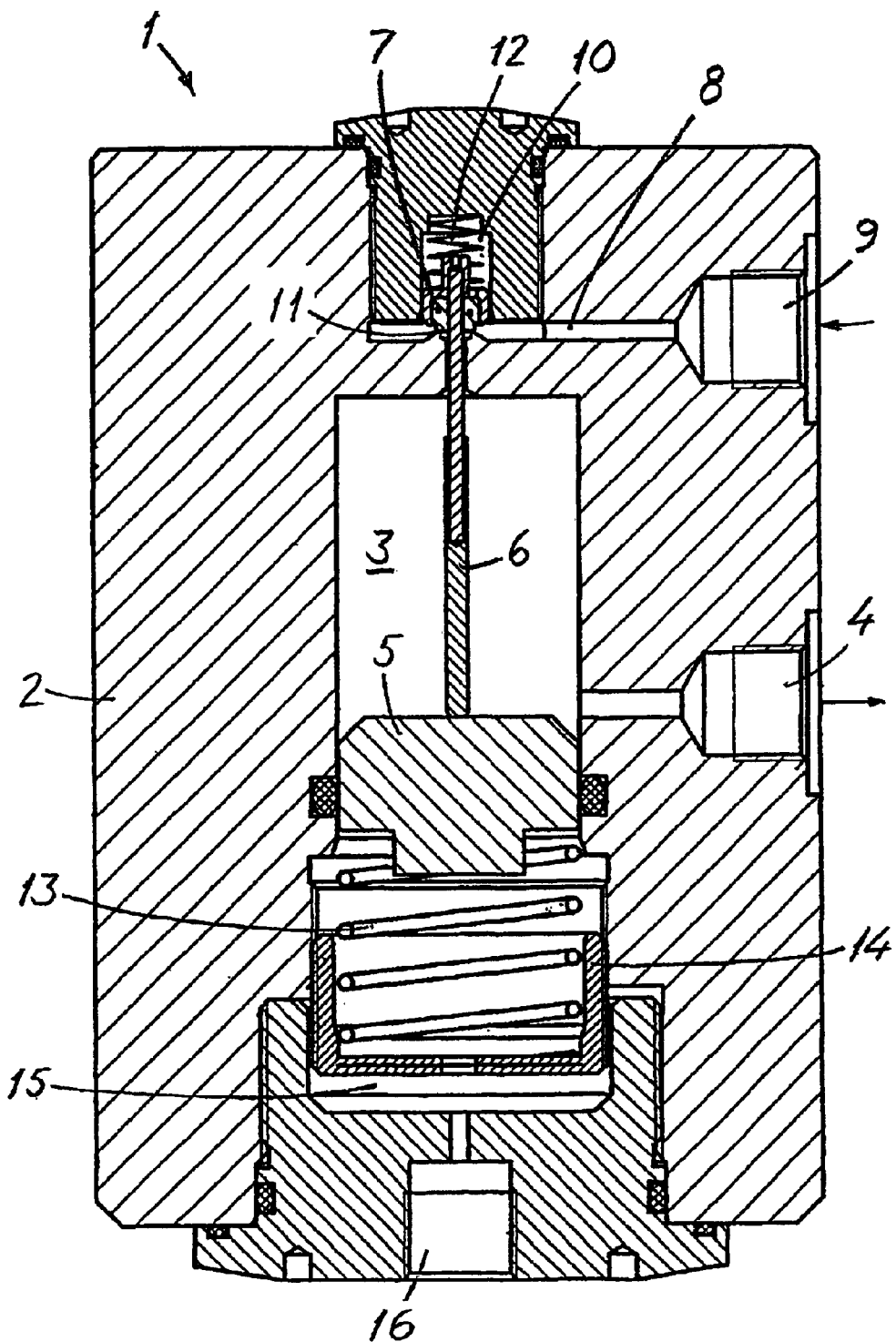

In the present invention a standard pressure regulating valve which is arranged to maintain a given downstream pressure P1, has been taken as a starting point. Such a valve 1 of a known type is shown in FIG. 1. The valve comprises a valve housing 2 having a cylindrical first chamber 3 communicating with a valve outlet 4, and a piston 5 which is displaceably arranged in the chamber 3. The piston cooperates through an operating rod 6 with a valve body 7 for opening and closing of a passage 8 between a valve inlet 9 and the upstream end of the chamber 3. The valve body 7 is fastened to the operating rod 6 and is slidably arranged in a cavity 10 in the valve housing 2. In the closed position of the valve, the valve body 7 rests against a seat 11, the valve body being influenced towards its closed position by a return spring 12.

As shown, the piston 5 is influenced by a preloaded spring 13 placed in a piston-forming spring holder 14, the spring holder being displaceable parallel to the piston 5 in a cavity 15 communicating with a channel 16 which, in operation, will be coupled to a surrounding pressure constituting a reference pressure.

When the valve is oriented as shown in FIG. 1, the piston 5 is influenced in an upwards direction by the surrounding pressure via the channel 16 and the biasing force from the spring 13. In the downwards direction the piston 5 is influenced by pressure forces from the fluid in the chamber 3, and by the tensioning force from the return spring 12, these forces being transferred to the piston 5 through the operating rod 6. The pressure in the chamber 3 will automatically adjust itself to a level conditioning that upwards directed and downwards directed forces are in equilibrium. When the pressure in the chamber 3 sinks so that this equilibrium is disturbed, the piston 5 will be pressed upwards and will seek to restore the balance in that the valve body 7 is pressed away from its seat 11 and opens for the supply of fluid to the chamber 3. The diameter of the seat 11 of the valve body 7 is small in relation to the diameter of the piston 5. Provided that there is not a very large difference between the above-mentioned desired downstream pressure P1, i.e. the pressure at the valve outlet 4, and the fluid pressure upstream of the valve body 5, the pressure in the chamber 3, and thereby the pressure at the valve outlet, will be able to be maintained stable on the value P1, in the manner which is the purpose of this known valve.

Figure 2:
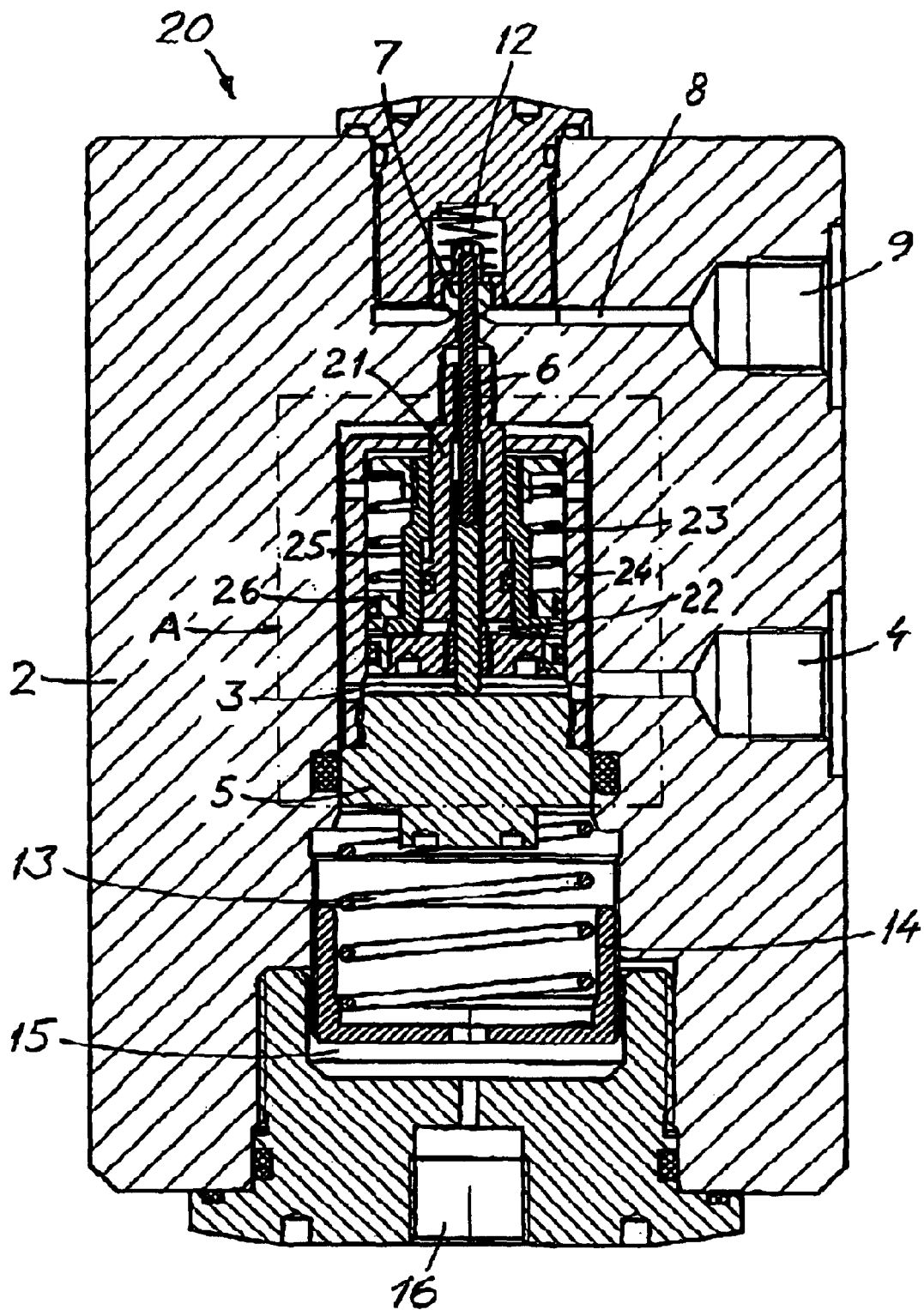
FIG. 2 shows a longitudinal section of a first embodiment of a pressure regulating valve according to the invention.

A modified embodiment of the valve in FIG. 1 is shown in FIG. 2 and constitutes a first embodiment of the regulating valve according to the invention.

As mentioned in the introduction, the regulating valve according to the invention is provided with a means causing that closing of the valve only takes place at a second pressure (P2) in the first chamber which is substantially higher than the first pressure (P1). In the modified valve 20 shown in FIG. 2, this is achieved in that the valve, which at the starting point is arranged to open for the supply of fluid when the downstream pressure falls below the value P1, is provided with a means utilising upstream fluid pressure to exert an increased upwardly directed force on the piston 5. This entails that the downstream pressure must be increased to a higher level before there is again a balance between the upwards and downwards directed forces acting on the piston 5. The valve 20 consequently will close only when the downstream pressure has achieved a higher value P2.

Figure 3:
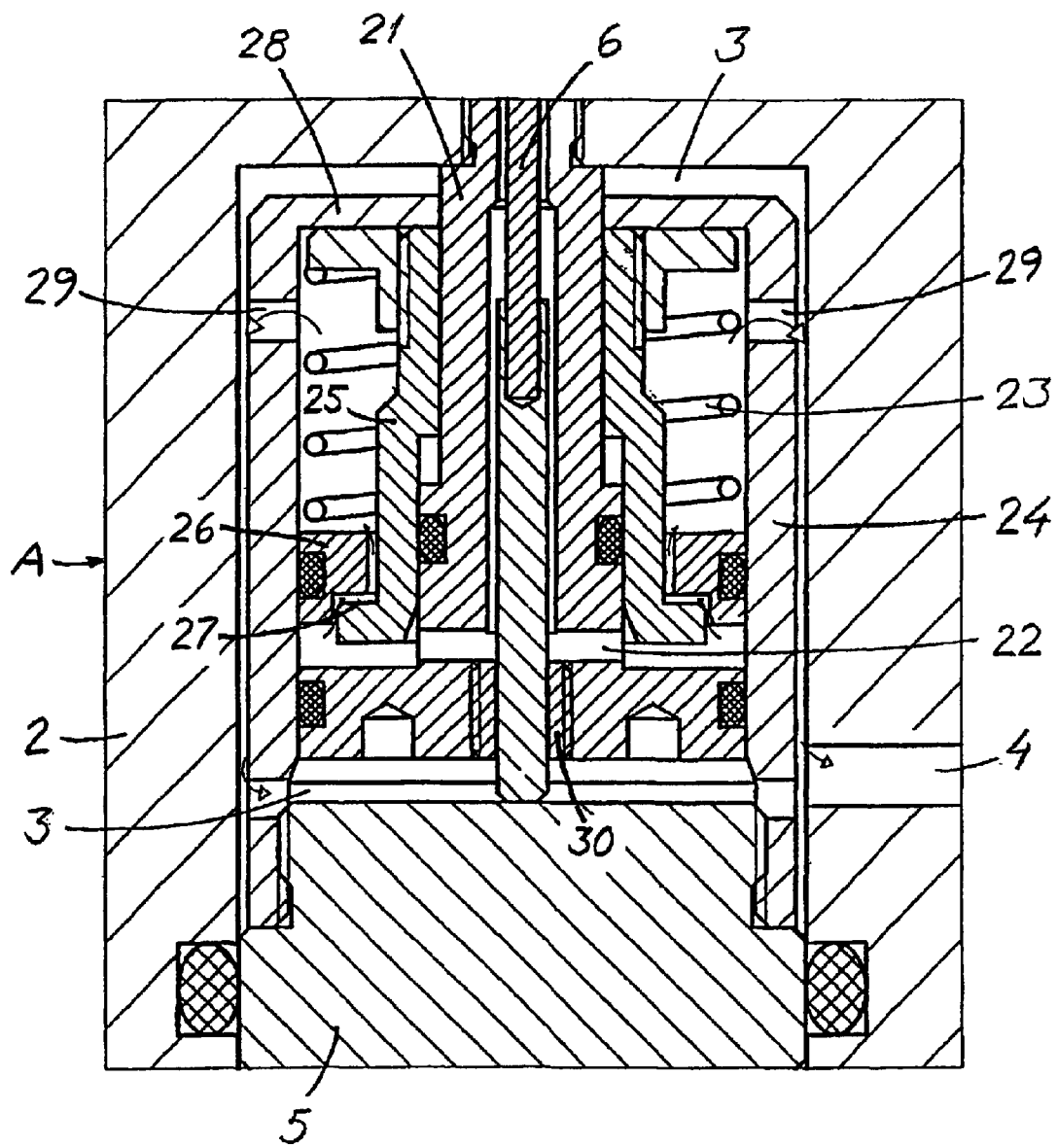
FIG. 3 shows a segment A of the valve in FIG. 2 on an enlarged scale, but in another operating phase.

As best shown in FIG. 3, which shows a segment A of the valve in FIG. 2 on an enlarged scale, said means firstly comprises a body 21 which is arranged within the first chamber 3 and is fastened to the valve housing 2 at the upstream end of the chamber 3. The body 21 contains a normally closed, second chamber 22 communicating with the valve inlet 9 via the valve body 7 (see FIG. 2). Further, there is provided for a means for the provision of a fluid connection between the second chamber 22 and the first chamber 3 by activation of the means in dependence on the pressure in the second chamber and under the influence of the force from a preloaded spring 23, and an element 24 for transferring force from the spring 23 to the piston 5 by activation of the connecting means, so that the valve closes only when the pressure in the second chamber 22 has increased to a value P2 causing said activation. With this activation the biasing force of the spring 23 is transferred to the piston 5, as further described below.

The connection-producing means comprises a sleeve 25 which is slidably mounted on a guide portion of the body 21, and an annular sealing disc 26 cooperating with a peripheral sealing surface 27 on the sleeve 25 and being influenced towards the closed position by the spring 23. The spring-force transferring element 24 comprises a cap-like body which is threaded to the piston 5 at a lower end and has an upper bottom portion 28 forming an abutment surface for the sleeve 25 and the spring 23 by said activation of the connecting means. As shown, the side walls of the cap 24 are provided with openings 29 forming part of said fluid connection formed by activation of the connecting means 25, 26, 27.

The operating rod 6 is passed through a narrow guide 30 at the centre of the body 21 below the second chamber 22. The leakage in this guide is very modest, and is without importance for the achieved regulating function which is to be further described below.

Said increase of the upwards directed force on the piston 5 is produced in that the fluid, in order to get into the chamber 3 when the valve is opened, must flow through the second chamber 22, the upwards directed force from the spring 23 then being transferred to the piston 5. The chamber 22 at the starting point is closed in that force from the spring 23 presses the sealing disc 26 against the sealing surface 27 on the sleeve 25.

In order to get into the second chamber or outlet chamber 3, the fluid must press the spring-loaded sealing disc 26 up from the sealing surface 27. This takes place only after the fluid has pressed the sleeve 25 upwards so that it obtains contact with the underside of the bottom portion 28 of the cap 24. Since the cap prevents the sleeve 25 from moving further upwards, the pressure in the chamber 22 will increase further until it is sufficiently high to press the spring-loaded sealing disc 26 upwards, so that the fluid can flow further and into the outlet chamber 3. This situation is shown in FIG. 3. When the sealing disc looses contact with the sealing surface 27, the tensioning force from the spring 23 will be transferred to the piston 5 via the cap 24. In this situation the pressure in the chamber 3 must rise to a level P2 before the valve closes again. Thus, the difference between the pressure levels P1 and P2 is directly determined by the biasing force of the spring 23.

The levels chosen for the pressure values P1 and P2, preferable are chosen so that they are close to the outer limits of the pressure range desired by the manufacturer as an operating range for the mechanical seals in the machine. Generally it will be favourable for the lifetime of the regulating valve that the number of activations per unit of time is as small as possible. For this purpose it is favourable to let the mechanical seals have an open connection to a relatively large, elastic buffer volume. This buffer volume is supplied with a given fluid quantity at each opening of the valve, so that the consumption of fluid can be measured at the same time as the frequency of activations is reduced. The size of the buffer volume must be balanced against how quickly one wants to register the changes with respect to leakage level.

Figure 4:
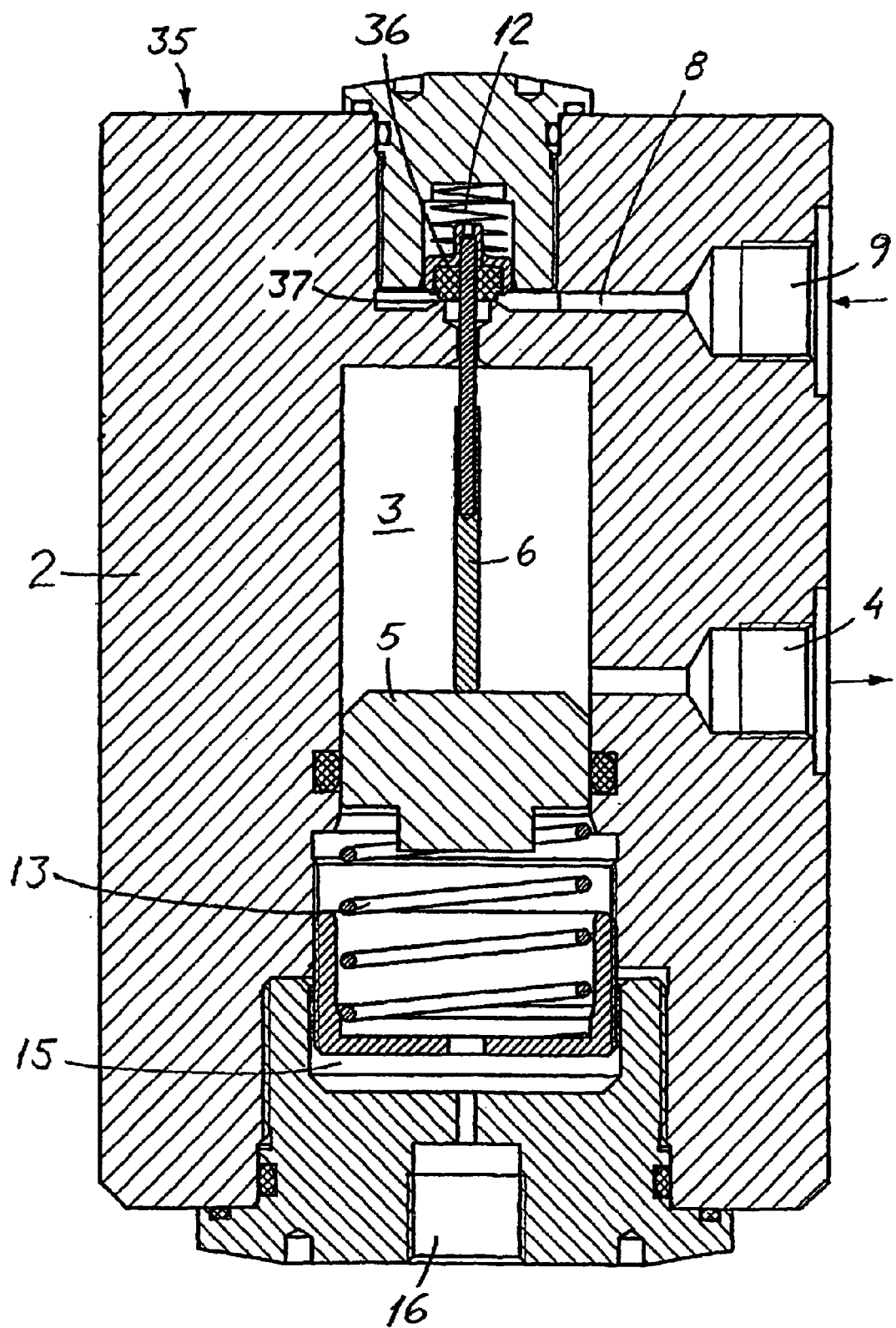
FIG. 4 shows a longitudinal section of another embodiment of the pressure regulating valve according to the invention.

A further embodiment of the regulating valve according to the invention is shown in FIG. 4. In this embodiment, the introductorily stated object of the invention is achieved by means of a simple modification of the regulating valve according to FIG. 1. If the relevant mechanical seals are dependent upon the fluid pressure being maintained at a stable level, it will be necessary with this solution to see to it that also the supply pressure of the barrier liquid is maintained at a stable level.

The modification required of the known regulating valve according to FIG. 1 is that the area of the sealing surface of the valve body 7 is increased without increasing the flow cross-section upstream of the chamber 3. Thus, FIG. 4 shows a valve 35 having a valve body 36 with a sealing surface which has a relatively large area, or in other words wherein the cross-section of the seat 37 is increased, whereas the flow cross-section of the passage upstream of the chamber 3 is relatively small. Said modification entails that lifting of the valve body 36 from the seat 37, so that the pressure regulating valve opens, will require a larger force on the valve body than previously. Consequently, with the same bias or preload of the spring 13, the pressure in the chamber 3 will fall to a lower level than previously before the regulating valve opens. When the regulating valve has been placed in the open position, the pressure will be nearly identical above and below the valve body 36. Consequently, the force seeking to press the valve body 36 towards the closed position, is strongly reduced. This implies that the regulating valve is closed only after the pressure in the chamber 3 has risen to the level sought to be maintained by the regulating valve before the cross-section of the seat was increased.

If it is presupposed that the increase of the cross-section of the seat is the only modification of the valve, and that one wants to maintain the same values of the pressures P1 and P2, the preload of the spring 31 consequently must be increased, and the cross-section of the seat 37 must be adapted to the difference between the supply pressure of the regulating valve and the desired level of the pressure P1.

What is claimed is:

1. A method for maintaining a fluid pressure within a defined volume, and simultaneously registering discharge of fluid from the volume as a result of leakage or consumption, characterised in that the fluid is supplied from a pressure regulating valve provided with a means opening for the supply of fluid to the volume when the pressure therein has sunk below a first value (P1), and shutting-off the fluid supply when the pressure in the volume has reached a preset second value (P2) which is substantially higher than the first value (P1), a pressure pulse delivered from the regulating valve thereby being registered, and that the frequency of delivered pressure pulses is monitored and utilised as a measure of occurring leakage and/or consumption of the fluid.

2. A regulating valve for maintaining a fluid pressure within a defined volume, and for simultaneous registering of the discharge of fluid from the volume as a result of leakage or consumption, which valve (20; 35) comprises a valve housing (20) having a first chamber (3) constituting said volume and communicating with a valve outlet (4), and a piston (5) arranged in the chamber (3) and being influenced in a first direction by a biasing spring (13) and a reference pressure, and cooperating through an operating rod (6) with a valve body (7) for opening and closing of a passage (8) between a valve inlet (9) and the upstream end of the chamber (3), the valve body (7) being spring-loaded towards the closed position in the opposite direction to that of the piston (5), so that the valve is closed when the piston is in equilibrium in the chamber (3) at a first pressure (P1) in the chamber, but opens when the pressure in the chamber (3) sinks below the first pressure (P1), characterised in that the valve (20; 35) is provided with a means causing that movement of the valve body (7) to the closed position of the passage (8) only takes place at a second pressure (P2) in the first chamber (3) which is substantially higher than the first pressure (P1), so that a distinct pressure pulse occurs at the valve outlet (4) after each opening of the valve.

3. A regulating valve according to claim 2, characterised in that said means is arranged to utilise upstream fluid pressure to exert an increased upwards directed force on the piston (5) in said first direction, so that the pressure in the first chamber (3), after that this pressure has sunk below the first pressure (P1), must be increased to a second substantially higher pressure (P2) before the piston (5) again comes into equilibrium and the valve (20) closes.

4. A regulating valve according to claim 3, characterised in that the means comprises a body (21) which is fastened to the valve housing (2) at the upstream end of the first chamber (3) and which contains a normally closed, second chamber (22) communicating with the valve inlet (9) via said valve body (7), a means (25, 26, 27) for the provision of a fluid connection between the second chamber (22) and the first chamber (3) by activation of the means in dependence on the pressure in the second chamber (22) and under the influence of the force from a preloaded spring (23), and an element (24) for transferring the force from the spring (23) to said piston (5) by activation of the connecting means (25, 26, 27), so that the valve (20) closes only when the pressure in the second chamber (22) has risen to said second pressure (P2) which causes said activation determined by the biasing force of the spring (23).

5. A regulating valve according to claim 4, characterised in that the connection-producing means comprises a sleeve (25) slidably mounted on a guide portion of said body (21), and an annular sealing element (26) cooperating with a peripheral sealing flange (27) on the sleeve (25) and being influenced towards the closed position of said spring (23), and that the force-transferring element (24) comprises a cap-like body fastened to the piston (5) and having a bottom portion (28) forming an abutment surface for the sleeve (25) and the spring (23) by said activation of the connecting means (25, 26, 27).

6. A regulating valve according to claim 2, characterised in that the sealing surface of the valve body (36) has a relatively large area whereas the flow cross-section of said passage downstream of the valve body (36) is relatively small, and that the biasing force for the biasing spring (31) of the piston (5) is chosen so that the valve (35) opens and closes at the desired first and second pressure values (P1 resp. P2).

7. A regulating valve according to one of the claims 2, characterized in that the valve outlet (4) is connected to a relatively large elastic buffer volume which is supplied with a given fluid quantity at each opening of the valve (20; 35), so that the consumption of fluid can be measured at the same time as the frequency of activations of the valve is reduced.

* * * * *